Feb. 19, 1924.
S. W. RUSHMORE
1,484,276
CAM ACTUATED DIAPHRAGM HORN
Filed Feb. 9, 1922
Fig. 1.
Fig. 2.
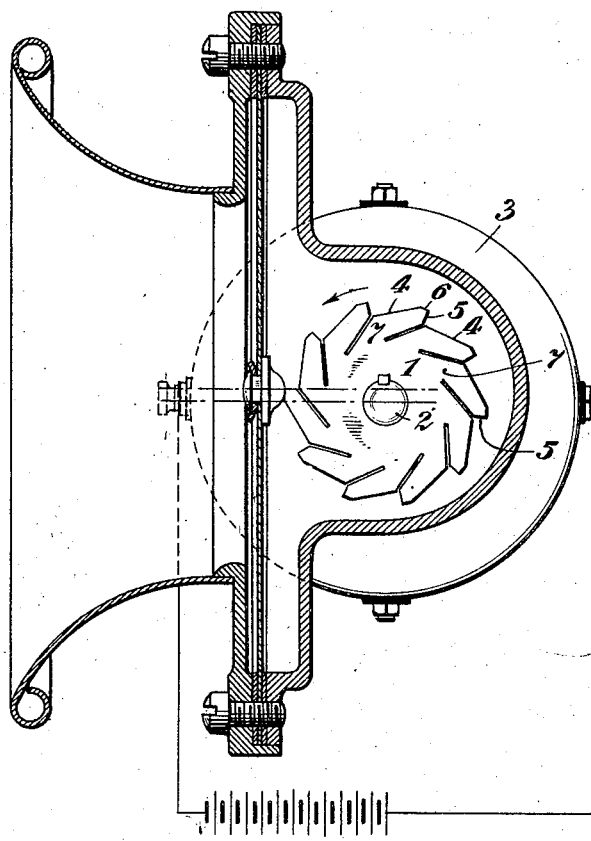
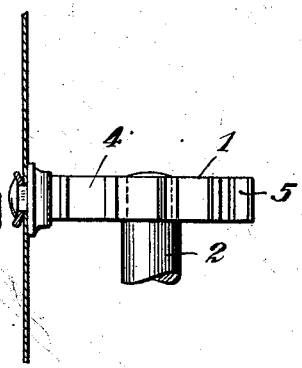
Inventor
Samuel W. Rushmore
By George C. Alcan
his Attorney Patented Feb. 19, 1924.

1,484,276

UNITED STATES PATENT OFFICE.

SAMUEL W. RUSHMORE, OF PLAINFIELD, NEW JERSEY.

CAM-ACTUATED DIAPHRAGM HORN.

Original application filed December 28, 1921, Serial No. 525,358. Divided and this application filed February 9, 1922. Serial No. 535,122.

*To all whom it may concern:*

Be it known that I, SAMUEL W. RUSHMORE, a citizen of the United States, and resident of Plainfield, in the county of Union and State of New Jersey, have invented certain new and useful Improvements in Cam-Actuated Diaphragm Horns, of which the following is a specification.

This application is a division of my prior application, Serial Number 525,358, filed December 28, 1921. As in the prior case, the invention relates to signal horns of the type in which a diaphragm is set into vibration by means of a motor-driven cam. Such horns may be made to give a music-like, and not disagreeable, note after the cam and its motor armature have come up to the speed corresponding to the natural period of the diaphragm, but during the intervals of acceleration, and until the rotating parts come into synchronism, and of deceleration, until the cam again comes to rest, such horns, particularly in the larger sizes, usually give a harsh and unpleasant sound.

Horns of this type are described in various Hutchison patents, as for instance No. 1,160,899, granted November 16, 1915, and, as is well known in the art, it was Hutchison's discovery of the synchronized or in-step operation of a motor-driven cam in combination with a diaphragm that made possible the present commercial types of motor-driven cam horns, now in commercial use everywhere. Prior to Hutchison, the driving of the cam at the out of synchronous or out of step speeds, particularly over-driving it at speeds far above synchronism with the diaphragm, has always resulted in destruction of the cams and diaphragms. In this particular stage the art has stood still until my present invention.

I have discovered that if, while retaining the hardness and stiffness afforded by a hardened steel cam, and without necessarily changing present-day diaphragm construction, both cam and diaphragm can be made to stand up indefinitely at the out of synchronous and particularly at the over-driving speeds by the simple expedient of forming an underlying slot beneath the cam teeth such as will destroy the solid-steel, anvil-like qualities of the cam and its concussion strains but without materially modifying the structural rigidity of the cam tips.

The principle of slotting beneath the teeth of the cam to relieve concussion strains without thereby making the teeth flexible or yielding may be applied to cams of the type shown in Fig. 3 of Hutchison Patent No. 1,160,899, granted Nov. 16, 1915, with the result that the cam may be adjusted into contact with the diaphragm wear piece at high speed without danger of rupturing the diaphragm or breaking the teeth of the cam. Or may be normally over-driven at speeds above synchronism, as by a double strength battery and a heavy over-lap of cam projection with respect to diaphragm wear piece. Or, with the normal slight over-lap adjustment described in said patent, the cams and diaphragm will last much longer.

In this Hutchison form of cam the undercut for purposes of my invention may be merely saw slits extending from the base of each tooth inward a desired distance and at a desired angle, which angle may approximate parallelism with the working faces of the cam projections.

The above and other features of my invention may be more fully understood from the description of the following figures, in which—

Fig. 1 is a transverse section showing the cam in a plan view, and

Fig. 2 is a detailed side elevation of the cam, the diaphragm being shown in section.

To those familiar with the present commercial forms of Klaxon horn, these figures will be recognized as showing one of the present-day commercial types of Klaxon horn, wherein the cam of Fig. 3 of said Hutchison Patent 1,160,899, is employed in the structure of Fig. 2 of said patent. The characteristics of this cam are fully described in said patent and while, as will be evident from my parent application, my present invention is not limited to this particular form of cam, I have selected it for illustration because it is one which I have actually tested by long periods of use with a 12-volt battery applied on the standard equipment 6-volt motor without substantial chipping of the surfaces or damage to the diaphragm.

In this particular embodiment of my invention, the standard equipment cast steel hardened cam, 1, is mounted on the shaft 2, which is the armature shaft of the motor within casing 3. In operation of the device, as is well-known, the back and forth elastic swings of the diaphragm are very powerful and the impacts on the cam are approximately radial. The cam surfaces 4 are tangential planes, the re-entrant rear faces 5 are more or less radial and the tips 6 are ground off primarily for the purpose of insuring concentric relation with the axis of shaft 2.

In the embodiment actually employed by me, saw slits were cut inward from the point of intersection of surfaces 4, 5, preferably at an angle not far from parallelism with the tangential surface, but preferably diverging slightly inward toward the axis, and preferably extending to a depth sufficiently radial to underlie practically all of the working surface 4 of the cam but preferably not extending to a depth sufficient to weaken the base 7 of the thus formed teeth.

Thus modified I find that the structural strength of the teeth is far in excess of any steady strains that can be put upon them, while impact vibrations in the metal are absorbed without producing the usual fracture effects on the tips of the teeth, or on the diaphragm.

For purposes of illustration but not as a limitation, I have diagrammatically indicated a 12-volt battery as employed in connection with the usual 6-volt Klaxon motor. I find that while continuous operation of such a motor by such a battery might result in over-heating the motor, nevertheless no harm will result from such intermittent use as is required for ordinary road signalling on an automobile.

I claim:

1. A rigid rotary cam for signal horns formed with a multiplicity of integral rigid cam teeth having inclined cam faces, re-entrant rear faces and slots under-running the cam faces.

2. The cam specified by claim 1 and wherein the cam faces are planes and the slots extend inward from near the faces of the rear faces of the teeth.

3. The cam specified by claim 1 and wherein the inwardly extending slots pitch inwardly more than the cam faces.

4. The cam specified by claim 1 and wherein the tips of the teeth have concentric surfaces exposed for direct radial impact.

Signed at Plainfield in the county of Union and State of New Jersey, this 6th day of February, A. D. 1922.

SAMUEL W. RUSHMORE.

Certificate of Correction.

It is hereby certified that in Letters Patent No. 1,484,276, granted February 19, 1924, upon the application of Samuel W. Rushmore, of Plainfield, New Jersey, for an improvement in "Cam-Actuated Diaphragm Horns," an error appears in the printed specification requiring correction as follows: Page 2, line 46, claim 2, for the word " faces " read *bases;* and that the said Letters Patent should be read with this correction therein that the same may conform to the record of the case in the Patent Office.

Signed and sealed this 18th day of March, A. D., 1924.

[SEAL.]

KARL FENNING,
*Acting Commissioner of Patents.*